United States Patent

Binford

Patent Number: 5,547,203
Date of Patent: Aug. 20, 1996

[54] SEGMENTED CERAMIC INLAY PISTON RING

[75] Inventor: John D. Binford, Richmond, Ind.

[73] Assignee: Dana Corporation, Toledo, Ohio

[21] Appl. No.: 265,356

[22] Filed: Jun. 24, 1994

[51] Int. Cl.⁶ ............................................. F16J 9/00
[52] U.S. Cl. ........................... 277/224; 277/215; 277/216
[58] Field of Search .................................. 277/215, 216, 277/223, 224, 235 R, 217, 236, 227

[56] References Cited

U.S. PATENT DOCUMENTS

| | | |
|---|---|---|
| 119,248 | 9/1871 | Sullivan . |
| 307,334 | 10/1884 | Richards . |
| 1,608,101 | 11/1926 | Johnson . |
| 2,472,540 | 6/1949 | Meador ................................ 277/223 |
| 2,696,038 | 12/1954 | Hunt ...................................... 29/156 |
| 3,560,006 | 2/1971 | Watanabe ............................. 277/224 |
| 3,811,692 | 5/1974 | Brenneke ............................. 277/223 |
| 3,947,607 | 3/1976 | Gazzard ................................ 427/37 |
| 4,037,300 | 7/1977 | Garner ................................ 29/148.4 |
| 4,077,637 | 3/1978 | Hyde .................................... 277/235 |
| 4,106,782 | 8/1978 | Hyde et al. .......................... 277/224 |
| 5,076,150 | 12/1991 | Webber ................................. 277/123 |

FOREIGN PATENT DOCUMENTS

| | | |
|---|---|---|
| 57-076363 | 5/1982 | Japan . |
| 0526707 | 9/1940 | United Kingdom ................. 277/223 |
| 1069875 | 5/1967 | United Kingdom . |
| 2245680 | 1/1992 | United Kingdom . |

*Primary Examiner*—Daniel G. DePumpo
*Attorney, Agent, or Firm*—Rader, Fishman & Grauer PLLC

[57] ABSTRACT

A piston ring comprises a generally annular ring body with a series of slots spaced circumferentially about an outer periphery of the ring body, each of the slots extending radially inwardly from the outer periphery. A hinge point is formed between adjacent slots, the hinge point corresponding to the outer periphery of the ring body. A wear surface material comprising ceramics is inlayed into each of the slots. The piston ring is formed by cutting a series of slots such as scallops about the outer periphery of the ring body that extend radially inwardly from the outer periphery and inlaying a wear surface material into the slots. The inlaying step may comprise the further step of thermally spraying the material into the slots. Then the outer periphery of the ring body may be ground to expose the wear surface material and create a finished outer surface.

8 Claims, 1 Drawing Sheet

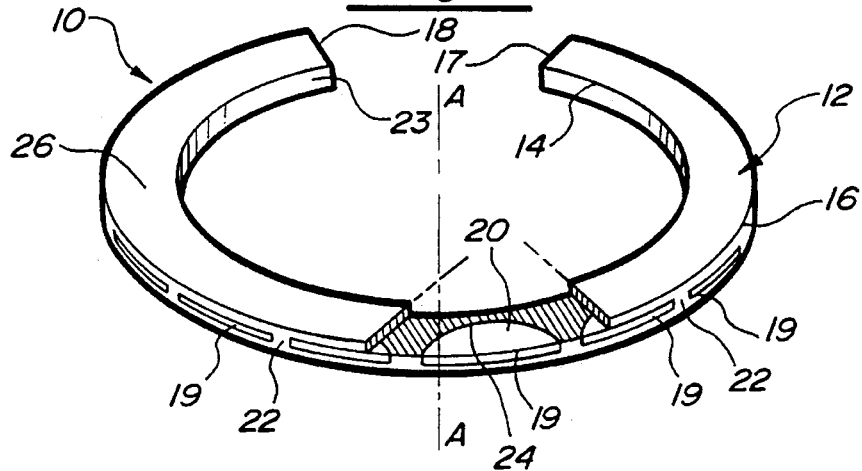
Fig-1
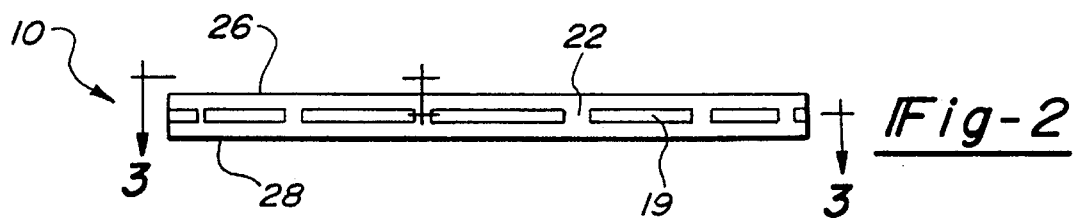
Fig-2
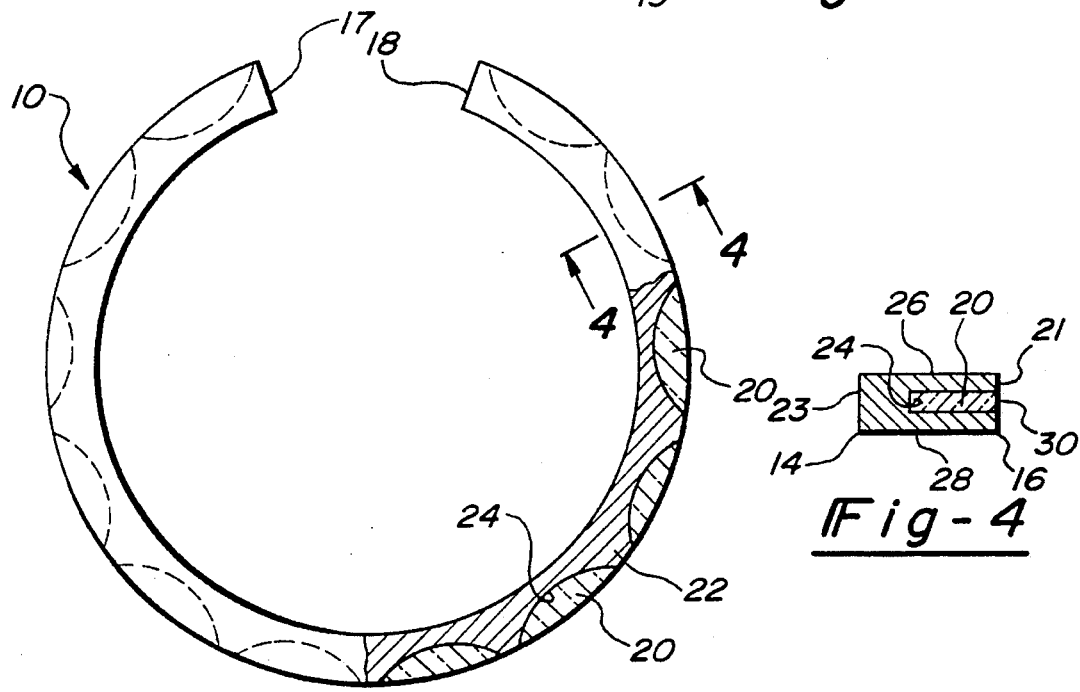
Fig-3
Fig-4

SEGMENTED CERAMIC INLAY PISTON RING

FIELD OF THE INVENTION

The present invention relates to a metallic piston ring having a series of circumferentially spaced slots about an outer periphery, and a wear surface material inlayed within the slots.

BACKGROUND OF THE INVENTION

Piston rings are well known. They are usually received within an annular groove disposed about an outer periphery of a piston. In turn, the piston is reciprocal within a cylinder. Typically, the piston ring is discontinuous, having two end portions. The end portions are separated from one another to expand the piston ring for insertion into a corresponding groove of the piston. The piston ring is then compressed, bringing the end portions closer together, to install the piston within the cylinder. A piston compresses fluids such as gases within the cylinder. In an internal combustion engine, these fluids are ignited, and expand, forcing the piston away from the point of ignition. The outer surface or bearing face of a piston ring in an internal combustion engine is subject to high temperatures, corrosion, and frictional interaction with the walls of the cylinder.

To improve durability, wear and scuff resistance, it is known to use a wear surface material comprising ceramics. Unfortunately, such a material is typically extremely brittle and subject to cracking or other unacceptable failure modes. Failure often occurs even before piston operation when the piston ring is expanded for installation into a corresponding groove of the piston and then compressed for insertion into the cylinder.

SUMMARY OF THE INVENTION

A piston ring extending about a longitudinal axis is disclosed with a generally annular ring body having an inner periphery and an outer periphery spaced a radial distance from the inner periphery. The ring body is preferably made from a ductile cast iron. The ring is discontinuous, having two end portions. The end portions are separated from one another to expand the piston ring for insertion into a corresponding groove of a piston. The piston ring is then compressed, bringing the end portions closer together, for installing the piston into a cylinder. A series of slots is spaced circumferentially about the outer periphery, each slot extending radially inwardly from the outer periphery. The slots do not overlap. Instead, a hinge point corresponding to the outer periphery of the ring body is formed between adjacent slots, although the circumferential extent of each hinge point is preferably minimized. When the piston ring is expanded or compressed, the flexing of the ring body takes place at the hinge points. Therefore, the hinge points allow the inlaying of an extremely brittle, long wearing scuff resistant material into the slots without cracking or other unacceptable failure modes.

A preferred wear surface material comprises ceramics to provide improved durability, wear and scuff resistance.

To provide sufficient structure and strength to the ring body, a radially inner extent of the slots is preferably no more than half the radial distance between the outer and inner periphery of the ring body. Additionally, the slots are preferably centered between an upper and lower face of the ring body, having a longitudinally axial extent of no more than 80 percent of the total longitudinally axial distance between upper and lower faces of the ring body.

A piston ring according to the present invention may be made by forming a generally annular ring body from a ductile cast iron. Then a series of slots are cut about the circumferential extent of the outer periphery of the ring body, leaving a hinge point between adjacent slots. A generally circular cutter is preferably used, forming a series of scallops, wherein each scallop is generally curved, comprising a series of generally circular segments. The cutting operation is terminated before intersecting the inner periphery of the ring body, leaving an uninterrupted inner surface. As noted above, the radial and longitudinal extent of the slots are controlled to prevent undesirable weakness to the ring body. Then a wear surface material is inlayed into each slot. Preferably, the inlaying step comprises the step of thermally spraying the wear surface material into the slots and onto the outer periphery to form a coating. Then the outer periphery of the piston ring is ground to a smaller diameter, exposing the wear surface material within the slots such that an outer radial extent of the wear surface material is flush with a finished outer surface of the ring body.

BRIEF DESCRIPTION OF THE DRAWINGS

The features and inventive aspects of the present invention will become more apparent upon reading the following detailed description, claims, and drawings, of which the following is a brief description:

FIG. 1 is a perspective view of a piston ring according to the present invention.

FIG. 2 is an end view of the piston ring.

FIG. 3 is a partial cross-sectional view taken along lines 3—3 of the piston ring of FIG. 2.

FIG. 4 is a cross-sectional view taken along lines 4—4 of the piston ring of FIG. 3.

DETAILED DISCLOSURE OF A PREFERRED EMBODIMENT

A piston ring 10 illustrated in FIGS. 1—4 extends about a longitudinal axis A—A. Ring 10 includes a generally annular ring body 12 with an inner periphery 14 and an outer periphery 16 spaced a radial distance from the inner periphery 14. Ring body 12 is preferably made from a ductile cast iron. Ring body 12 is discontinuous, having two end portions 17 and 18. The end portions are separated from one another to expand the piston ring for insertion into a corresponding groove of a piston. The piston ring is then compressed, bringing the end portions closer together, to install the piston into a cylinder. A series of slots 19 are spaced circumferentially about the outer periphery, each of slots 19 extending radially inwardly from the outer periphery. A wear surface material 20 is inlayed in each of slots 19 until slot 19 is filled and material 20 is generally flush with the outer periphery 16 of the ring body. Outer periphery 16 may then be ground to form a finished outer surface 21 such that an outer radial extent 30 of material 20 is flush with outer surface 21 of ring body 12.

A preferred wear surface material is a ceramic that is extremely brittle, but with superior wear qualities against scuffing, heat, and corrosion.

Slots 19 do not overlap one another. Instead, a hinge point 22 is formed between adjacent slots 19, each hinge point corresponding to the outer periphery of the ring body 12.

Thus, hinge points 22 are circumferentially spaced about ring body 12. The hinge points allow the inlaying of an extremely brittle, long wearing scuff resistant material 20 into slots 19 without cracking or other unacceptable failure modes. Preferably, the circumferential extent of each hinge point 22 is minimized to maximize the amount of wear surface material 20 that is exposed about the circumferential extent of ring body 12.

Even with slots 19, an inner surface 23 of inner periphery 14 is uninterrupted. A radially innermost extent 24 of each slot 19 generally extends no more than one-half of the radial distance between the inner and outer peripheries of ring body 12.

As best shown in FIG. 2, ring body 12 has a longitudinally upper face 26 and a longitudinally lower face 28. Slots 19 are preferably centered longitudinally between upper face 26 and lower face 28.

As shown in FIG. 3, upper face 26 and lower face 28 are uninterrupted by slots 19. Preferably, a longitudinally axial extent of each slot 19 is no greater than 80 percent of the total longitudinal between the upper and lower faces. The radial and longitudinal extent of slots 19 are controlled to provide sufficient structure and operational strength to piston ring 10. At each hinge point 22, the ductile cast iron extends the full longitudinally axial distance between faces 26 and 28, radially from inner periphery 14 to outer periphery 16.

Inventive piston ring 10 may be made by forming a generally annular ring body 12 about a longitudinal axis A—A with an inner periphery 14 and an outer periphery 16. Then a series of slots 19 are cut about the circumferential extent of outer periphery 16. For ease of manufacturing, a generally circular cutter forms a series of scallops, wherein each scallop is generally curved, comprising a series of generally circular segments. The cutting operation stops before intersecting an inner periphery 14 of ring body 12, leaving an uninterrupted inner surface 23.

The slots 19 are spaced circumferentially about outer periphery 16 to create a hinge point 22 between adjacent slots. As noted above, hinge points 22 are preferably minimized. Additionally, both the radial and longitudinal extent of the slots are controlled to prevent undesirable weakness to piston ring 10. A wear surface material 20 is next inlayed into each of slots 19. The inlaying step may comprise the step of thermally spraying the wear surface material into and generally filling slots 19 and possibly onto the outer periphery 16 to form a coating. Then the outer periphery 16 of piston ring 10 is ground to a smaller diameter such that an outer radial extent 30 of wear surface material 20 is flush with a finished outer surface 21 of ring body 12, as shown in Figure 4.

A preferred embodiment of the present invention has been described. Variations and modifications may be employed without departing from the scope of the present invention. Accordingly, the following claims should be studied to learn the true scope of the present invention.

What is claimed is:

1. An annular piston ring extending about a longitudinal axis, comprising:

a ring body with an inner periphery and an outer periphery, said outer periphery spaced a radial distance from said inner periphery, said body being discontinuous and including two end parts spaced selectively away from one another;

a series of closed slots spaced circumferentially about said outer periphery, each of said slots extending radially inwardly from said outer periphery, a hinge point formed between each pair of adjacent slots, said hinge point corresponding to said outer periphery of said ring body such that said slots are non-overlapping, a flexing of said ring body taking place at each said hinge point to selectively alter spacing between said end parts, an inner surface of said inner periphery being uninterrupted such that a radially innermost extent of each of said slots is positioned radially outwardly of said inner periphery; and a wear surface material inlayed in each of said slots, said wear material remaining undamaged by said flexing.

2. An annular piston ring as recited in claim 1, wherein said slots are scallops.

3. An annular piston ring as recited in claim 2, wherein said wear surface material comprises ceramics.

4. An annular piston ring as recited in claim 3, wherein said wear surface material is spray coated into said slots.

5. An annular piston ring as recited in claim 4, wherein said outer periphery is ground to form a finished outer surface.

6. An annular piston ring as recited in claim 4, wherein a radial distance between said inner periphery of said ring and said radially innermost extent of each of said slots is approximately one-half the radial distance between said inner and outer peripheries of said ring body.

7. An annular piston ring as recited in claim 1, wherein said ring body comprises a longitudinally upper face and a longitudinally lower face, said slots centered between said upper and lower faces.

8. An annular piston ring as recited in claim 7, wherein a longitudinally axial extent of each slot is no greater than 80 percent of the total longitudinally axial distance between said upper and lower faces.

\* \* \* \* \*